(12) United States Patent
Granström

(10) Patent No.: US 10,536,729 B2
(45) Date of Patent: *Jan. 14, 2020

(54) METHODS, SYSTEMS, AND MEDIA FOR TRANSFORMING FINGERPRINTS TO DETECT UNAUTHORIZED MEDIA CONTENT ITEMS

(71) Applicant: Google LLC, Mountain View, CA (US)

(72) Inventor: Johan Granström, Zurich (CH)

(73) Assignee: Google LLC, Mountain View, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/941,808

(22) Filed: Mar. 30, 2018

(65) Prior Publication Data

US 2018/0332319 A1 Nov. 15, 2018

Related U.S. Application Data

(63) Continuation of application No. 15/591,470, filed on May 10, 2017, now Pat. No. 9,936,230.

(51) Int. Cl.
*H04N 7/167* (2011.01)
*H04N 21/234* (2011.01)
(Continued)

(52) U.S. Cl.
CPC ..... *H04N 21/23418* (2013.01); *G06F 16/783* (2019.01); *G06F 16/7844* (2019.01);
(Continued)

(58) Field of Classification Search
CPC ......... H04N 21/23418; H04N 21/2541; H04N 21/835
See application file for complete search history.

(56) References Cited

U.S. PATENT DOCUMENTS 7,930,546 B2 * 4/2011 Rhoads ................ G10L 25/48
358/3.28
8,094,872 B1 * 1/2012 Yagnik ............. H04N 21/23418
380/201

(Continued)

FOREIGN PATENT DOCUMENTS

EP 2323046 5/2011
WO WO 2008/143768 11/2008

OTHER PUBLICATIONS

Notice of Allowance dated Dec. 7, 2017 in U.S. Appl. No. 15/591,470.
(Continued)

*Primary Examiner* — Jason P Salce
(74) *Attorney, Agent, or Firm* — Byrne Poh LLP

(57) ABSTRACT

Methods, systems, and media for transforming fingerprints to detect unauthorized media content items are provided. The method comprises: receiving criteria relating to an application of a circumvention technique to one or more video content items, wherein the criteria includes abuse criteria that describes the circumvention technique and a transform for use with the one or more video content items in which the circumvention technique was applied; generating an abuse query that includes at least a portion of the abuse criteria that describes the circumvention technique; determining from a plurality of video content items, a subset of video content items responsive to the abuse query; applying, for each video content item in the subset of video content items, the transform to each video content item to obtain a transformed video content item; generating, for each transformed video content item, a fingerprint that represents the transformed video content item; and comparing the fingerprint of the transformed video content item to a plurality of fingerprints associated with reference video content items to determine whether the video content item (Continued)

corresponding to the transformed video content item matches one of the reference video content items.

19 Claims, 5 Drawing Sheets

(51) Int. Cl.
*H04N 21/254* (2011.01)
*G06F 16/783* (2019.01)
*H04N 21/835* (2011.01)

(52) U.S. Cl.
CPC ...... *G06F 16/7847* (2019.01); *G06F 16/7864* (2019.01); *H04N 21/2541* (2013.01); *H04N 21/835* (2013.01)

(56) References Cited

U.S. PATENT DOCUMENTS

| | | | |
|---|---|---|---|
| 8,150,096 B2* | 4/2012 | Alattar | G06T 1/0064 380/200 |
| 8,229,219 B1 | 7/2012 | Ioffe | |
| 8,587,668 B2 | 11/2013 | Haritaoglu | |
| 8,611,689 B1 | 12/2013 | Yagnik et al. | |
| 8,947,595 B1 | 2/2015 | Tucker et al. | |
| 8,953,836 B1 | 2/2015 | Postelnicu et al. | |
| 9,177,209 B2 | 11/2015 | Chang et al. | |
| 9,529,840 B1 | 12/2016 | Granström et al. | |
| 2002/0152261 A1* | 10/2002 | Arkin | G06F 21/10 709/202 |
| 2005/0154892 A1 | 7/2005 | Mihcak et al. | |
| 2007/0239756 A1* | 10/2007 | Li | G06F 16/951 |
| 2008/0209220 A1* | 8/2008 | Oostveen | G06T 1/0064 713/176 |
| 2008/0226124 A1* | 9/2008 | Seo | H04N 1/3217 382/100 |
| 2009/0165031 A1* | 6/2009 | Li | G06F 21/10 725/22 |
| 2010/0287201 A1* | 11/2010 | Damstra | G06F 21/10 707/780 |
| 2012/0182318 A1* | 7/2012 | Mansfield | G06T 3/00 345/643 |
| 2013/0085825 A1* | 4/2013 | Davis | G06Q 50/184 705/14.7 |
| 2017/0060862 A1* | 3/2017 | Wang | G06F 16/783 |

OTHER PUBLICATIONS

Esmaeili et al., "A Robust and Fast Video Copy Detection System Using Content-Based Fingerprinting", IEEE Transactions On Information Forensics And Security, vol. 6, No. 1, Mar. 2011, pp. 213-226.

International Search Report and Written Opinion dated May 14, 2018 in International Patent Application No. PCT/US2018/017,020.

Lu, Jian., "Video Fingerprinting For Copy Identification: From Research to Industry Applications", Visual Communications and Image Processing, Jan. 19, 2009, pp. 1-15.

\* cited by examiner

METHODS, SYSTEMS, AND MEDIA FOR TRANSFORMING FINGERPRINTS TO DETECT UNAUTHORIZED MEDIA CONTENT ITEMS

CROSS-REFERENCE TO RELATED APPLICATION

This application is a continuation of U.S. patent application Ser. No. 15/591,470, filed May 10, 2017, which is hereby incorporated by reference herein in its entirety.

TECHNICAL FIELD

The disclosed subject matter relates to methods, systems, and media for transforming fingerprints to detect unauthorized media content items. More particularly, the disclosed subject matter relates to receiving abuse criterion and/or transform criterion that describe a circumvention technique, transforming a media content item that matches the abuse criterion, generating one or more fingerprints for at least a portion of the transformed media content item, and determining whether the transformed fingerprints match one or more stored media content items.

BACKGROUND

Video content providers can receive uploaded video content, store the uploaded video content, and then provide the uploaded video content to many users, for example, by streaming the video content to multiple user devices. These video content providers may determine whether the uploaded video content matches video content in a reference database, for example, that includes reference files of copyrighted content. However, it is often difficult to determine whether uploaded video content matches a reference file of copyrighted content. For example, with the advent of immersive or 360-degree spherical video content, these video content providers have begun to receive uploaded video content containing three-dimensional video content. It is difficult to determine whether such three-dimensional video content matches two-dimensional video content stored in a reference file.

Accordingly, it is desirable to provide methods, systems, and media for transforming fingerprints to detect unauthorized media content items.

SUMMARY

Methods, systems, and media for transforming fingerprints to detect unauthorized media content items are provided.

In accordance with some embodiments of the disclosed subject matter, a computer-implemented method for detecting unauthorized media content items is provided, the method comprising: receiving, using a hardware processor, criteria relating to an application of a circumvention technique to one or more video content items, wherein the criteria includes abuse criteria that describes the circumvention technique and a transform for use with the one or more video content items in which the circumvention technique was applied; generating, using the hardware processor, an abuse query that includes at least a portion of the abuse criteria that describes the circumvention technique; determining, using the hardware processor, from a plurality of video content items, a subset of video content items responsive to the abuse query; applying, using the hardware processor, for each video content item in the subset of video content items, the transform to each video content item to obtain a transformed video content item; generating, using the hardware processor, for each transformed video content item, a fingerprint that represents the transformed video content item; and comparing, using the hardware processor, the fingerprint of the transformed video content item to a plurality of fingerprints associated with reference video content items to determine whether the video content item corresponding to the transformed video content item matches one of the reference video content items.

In some embodiments, the criterion includes timing information that indicates a start time of the application of the circumvention technique and the method further comprises filtering the plurality of video content items based on the timing information.

In some embodiments, the subset of video content items is determined in response to detecting a media event associated with a portion of the plurality of video content items.

In some embodiments, the method further comprises: storing the abuse query in association with the transform for applying to the video content item that matches the abuse query in a queue containing a plurality of abuse query-transform pairs; and executing the plurality of abuse query-transform pairs on the plurality of video content items at a given time interval.

In some embodiments, the method further comprises searching, based on the abuse query, through playback information associated with the plurality of video content items to determine the subset of video content items.

In some embodiments, the method further comprises generating a plurality of fingerprints associated with the transformed video content item, wherein each of the plurality of fingerprints represents at least a portion of the transformed video content item.

In some embodiments, the method further comprises causing an indication of the match to be transmitted to a computing device in response to determining that the video content item corresponding to the transformed video content item matches one of the reference video content items by at least a threshold amount.

In accordance with some embodiments of the disclosed subject matter, a system for detecting unauthorized media content items is provided, the system comprising a hardware processor that is configured to: receive criteria relating to an application of a circumvention technique to one or more video content items, wherein the criteria includes abuse criteria that describes the circumvention technique and a transform for use with the one or more video content items in which the circumvention technique was applied; generate an abuse query that includes at least a portion of the abuse criteria that describes the circumvention technique; determine from a plurality of video content items, a subset of video content items responsive to the abuse query; apply, for each video content item in the subset of video content items, the transform to each video content item to obtain a transformed video content item; generate, for each transformed video content item, a fingerprint that represents the transformed video content item; and compare the fingerprint of the transformed video content item to a plurality of fingerprints associated with reference video content items to determine whether the video content item corresponding to the transformed video content item matches one of the reference video content items.

In accordance with some embodiments of the disclosed subject matter, a non-transitory computer-readable medium containing computer-executable instructions that, when executed by a processor, cause the processor to perform a method for detecting unauthorized media content items is provided, the method comprising: receiving criteria relating to an application of a circumvention technique to one or more video content items, wherein the criteria includes abuse criteria that describes the circumvention technique and a transform for use with the one or more video content items in which the circumvention technique was applied; generating an abuse query that includes at least a portion of the abuse criteria that describes the circumvention technique; determining from a plurality of video content items, a subset of video content items responsive to the abuse query; applying, for each video content item in the subset of video content items, the transform to each video content item to obtain a transformed video content item; generating, for each transformed video content item, a fingerprint that represents the transformed video content item; and comparing the fingerprint of the transformed video content item to a plurality of fingerprints associated with reference video content items to determine whether the video content item corresponding to the transformed video content item matches one of the reference video content items.

In accordance with some embodiments of the disclosed subject matter, a system for detecting unauthorized media content items is provided, the system comprising: means for receiving criteria relating to an application of a circumvention technique to one or more video content items, wherein the criteria includes abuse criteria that describes the circumvention technique and a transform for use with the one or more video content items in which the circumvention technique was applied; means for generating an abuse query that includes at least a portion of the abuse criteria that describes the circumvention technique; means for determining from a plurality of video content items, a subset of video content items responsive to the abuse query; means for applying, for each video content item in the subset of video content items, the transform to each video content item to obtain a transformed video content item; means for generating, for each transformed video content item, a fingerprint that represents the transformed video content item; and means for comparing the fingerprint of the transformed video content item to a plurality of fingerprints associated with reference video content items to determine whether the video content item corresponding to the transformed video content item matches one of the reference video content items.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
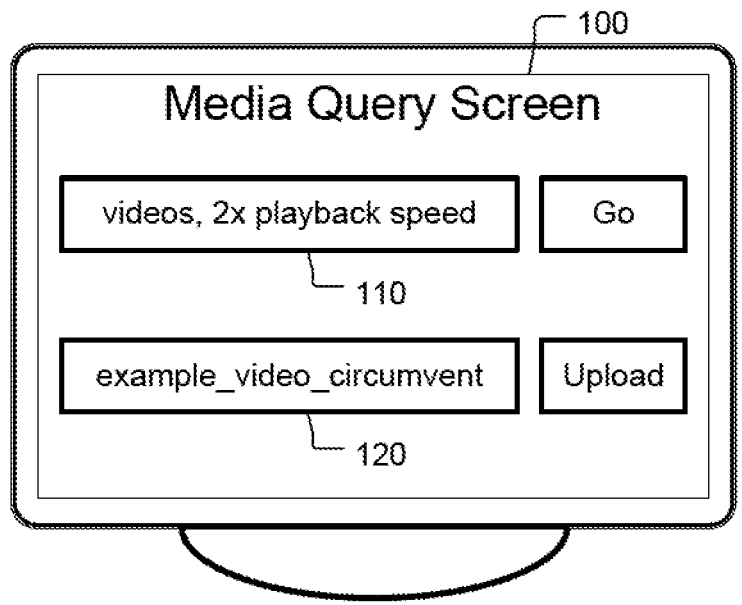
FIG. 1 shows an illustrative example of a user interface for receiving abuse criterion that describes the circumvention technique being applied to one or more video content items and/or a video content upload that may exhibit the circumvention technique in accordance with some embodiments of the disclosed subject matter.

In accordance with various embodiments, mechanisms (which can include methods, systems, and media) for transforming fingerprints to detect unauthorized media content items are provided.

In some embodiments, the mechanisms described herein can receive abuse criterion and/or transform criterion that describe a circumvention technique applied to one or more media content items. In response to receiving the abuse criterion, the mechanisms can, in some embodiments, generate an abuse query, such as an abuse query in a structured language format, based on the abuse criterion. The abuse query can be associated with a received transform and stored in a storage device for execution.

In some embodiments, the mechanisms can execute the abuse query by accessing a playback log or any other suitable source of user playback information. For example, the mechanisms described herein can aggregate playback information associated with multiple media content items and determining which of the multiple media content items are responsive to an abuse query based on the aggregated playback information. It should be noted that playback information can include the playback speed set by a user when playing back a media content item, a referral URL associated with a media content item, a focus to a particular position or angle within a spherical media content item, player cropping information, audience retention rate information, vertical information, etc.

In some embodiments, the mechanisms can then apply a transform to each media content item that is responsive to the abuse query, thereby generating a transformed media content item. For example, in response to obtaining a media content item in which users are playing back the entirety of the media content item at a 2× playback speed, the mechanisms can apply the associated transform that generates a transformed media content in which the media content is presented at twice the playback speed. One or more fingerprinted or other suitable compact representations, such as a video fingerprint, an audio fingerprint, and/or a melody fingerprint of a portion of the transformed media content can be generated, thereby obtaining one or more transformed fingerprints of the media content item.

In some embodiments, the mechanisms can compare the transformed fingerprints with fingerprints of stored media content items, such as fingerprints associated with reference files in a reference database, to determine whether a match exists. For example, in response to determining that the transformed fingerprint matches at a least a threshold amount of a fingerprint of a stored media content item, the mechanisms can perform an action in connection with the media content item.

In some embodiments, the mechanisms described herein can be used to detect particular types of video content in an uploaded video content item. For example, in some embodiments, the mechanisms can be used to detect potentially copyrighted video content or potentially copyrighted audio content within the uploaded video content item. It should be noted that various fingerprinting techniques have been used to identify copyrighted content, for example, by matching a portion of a content item to a reference content item in a database of reference content items. However, these fingerprinting techniques are sometimes unable to identify copyrighted video content when an uploaded video content item is a modified version of the copyrighted video content item. For example, in instances where the uploaded video content item includes a video content item that has been modified to be presented in half of its original speed and instructing the viewer of the modified video content item to play back the modified video content item at twice the playback speed (e.g., a 2× playback speed adjustment), the fingerprinting techniques may be unable to detect a match to video content in the reference database.

These mechanisms can, for example, allow a content server to identify affected media content items without relying on an analysis of a media content item that was performed when the media content item was uploaded to a content server. In addition, these mechanisms can also allow the content server to continuously detect the application of new forms of circumvention techniques that may not have been used at the time the media content item was uploaded to the content server. In another example, these mechanisms can allow the content server to identify user accounts that have uploaded multiple media content items that have been modified with a circumvention technique.

It should be noted that, although the embodiments described herein generally relate to video content items, the mechanisms described herein can be applied to any suitable media content item, such as audio content items.

Turning to FIG. 1, an illustrative example 100 of a user interface for receiving abuse criterion that describes an observed circumvention technique is shown in accordance with some embodiments of the disclosed subject matter. As illustrated, user interface 100 can include an input interface 110 for receiving abuse criterion that describes an observed circumvention technique applied to one or more media content items and an upload interface 120 for receiving an uploaded media content item.

In some embodiments, input interface 110 can include any suitable user interface elements for allowing a user of user interface 100 to provide abuse criterion that describes an observed circumvention technique applied to one or more media content items. For example, as shown in FIG. 1, in some embodiments, input interface 110 can receive query criteria, such as "videos" and "2× playback speed" and a submission button that, when selected, can cause an abuse query to be generated.

Additionally or alternatively, in some embodiments, upload interface 120 can include any suitable user interface elements for allowing a user of user interface 100 to provide an exemplary media content item in which a circumvention technique may have been applied. For example, as also shown in FIG. 1, in some embodiments, upload interface 120 can receive a link to a video content item in which a circumvention technique may have been applied. In another example, any other suitable identifying information can be indicated via upload interface 120. For example, in some embodiments, the identifying information can include a name of a video content item, a name of a creator of the video content item, keywords associated with the video content item, a video identifier, and/or any other suitable information. In response to providing a link or any other suitable media content identifier information, an abuse query can be generated in response to analyzing the playback information associated with the video content item.

Figure 2:
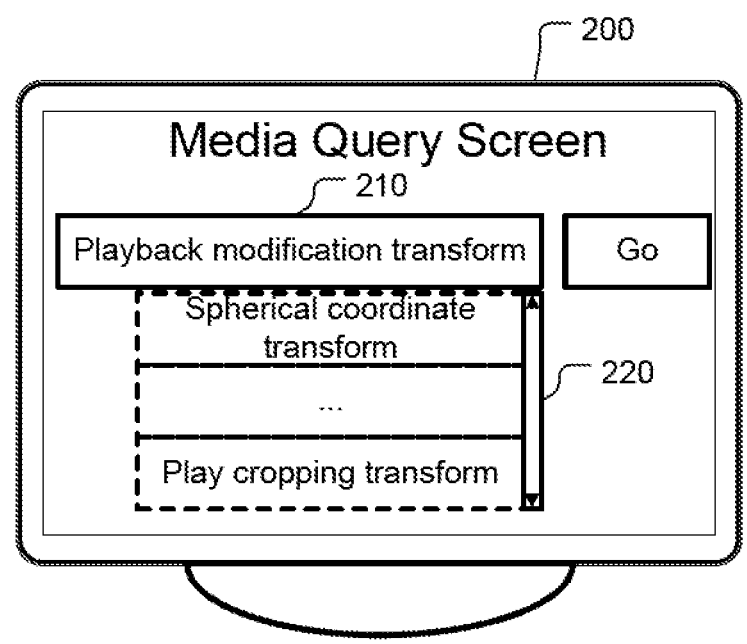
FIG. 2 show an illustrative example of a user interface for receiving a transform for applying to video content items responsive to the abuse criterion or the abuse query in accordance with some embodiments of the disclosed subject matter.

Turning to FIG. 2, an illustrative example 100 of a user interface for receiving and/or selecting a transform to apply to media content items in which an observed circumvention technique may have been applied is shown in accordance with some embodiments of the disclosed subject matter. As illustrated, user interface 200 can include a transform selection interface 210 for receiving a transform from a list of available transforms that can be applied to one or more media content items responsive to an abuse query. For example, in connection with input interface 110 of FIG. 1, a list of available transforms 220 can be generated in response to the abuse criterion entered in input interface 110 (e.g., one or more transforms likely to reverse a circumvention technique). In another example, in connection with upload interface 120 of FIG. 1, the list of available transforms 220 can be generated in response to analyzing an uploaded media content item or playback information associated with the media content item. In yet another example, the list of available transforms 220 can be generated based on the transform capabilities of a video editing application.

It should be noted that any suitable interface elements for receiving a transform can be provided. For example, in some embodiments, an input interface can be presented and, in response to keywords inputted by the user, a transform can be selected based on the inputted keywords. In another example, in some embodiments, a transform can be selected based on the abuse criterion inputted in input interface 110 of FIG. 1. In yet another example, in some embodiments, a suggested transform can be presented in interface 200 based on any suitable information, such as abuse criterion inputted in input interface 110, an analysis of the playback information associated with a media content item identified in upload interface 120, etc.

Figure 3:
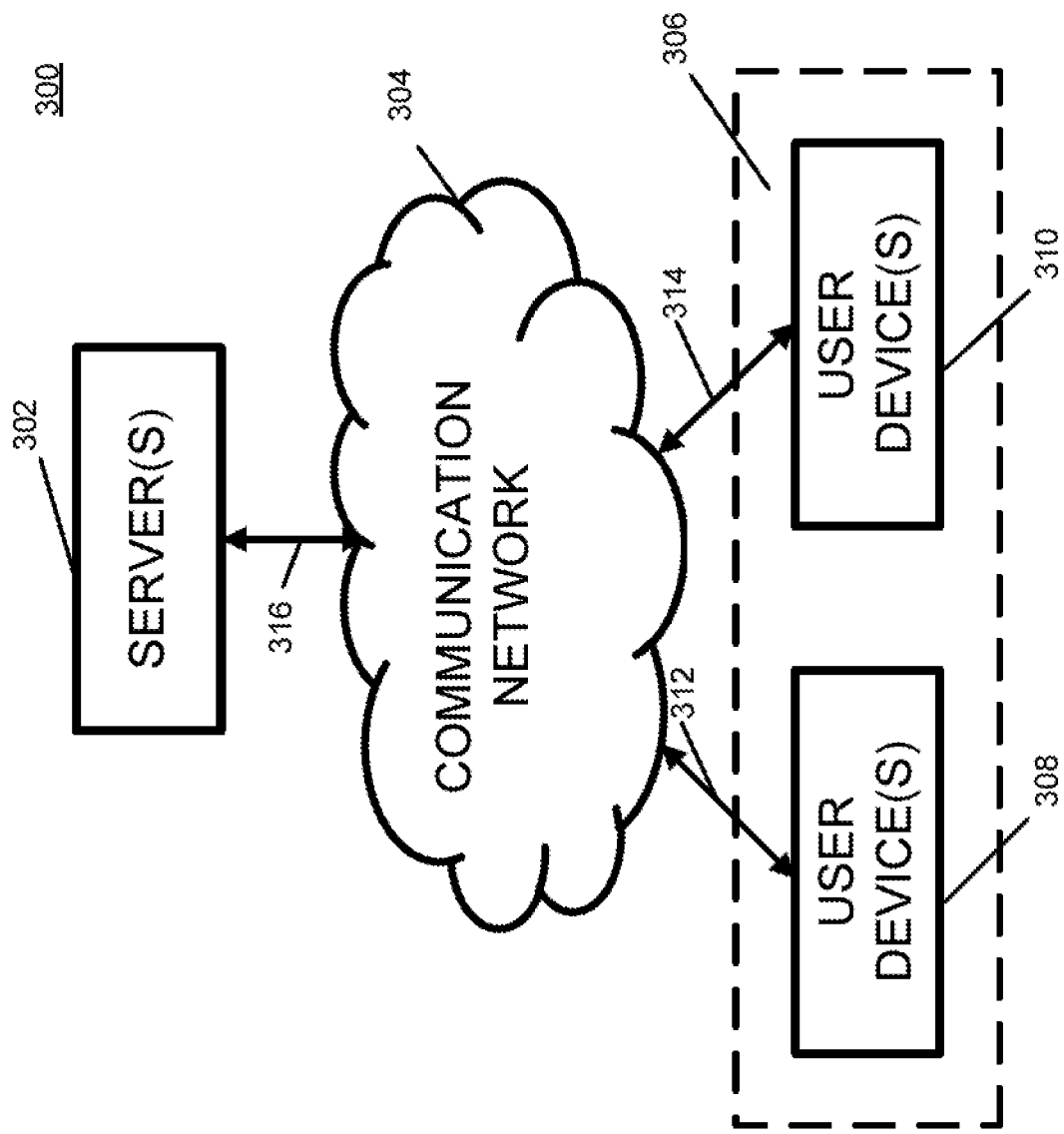
FIG. 3 shows a schematic diagram of an illustrative system suitable for implementation of mechanisms described herein for transforming fingerprints for detecting unauthorized media content items in accordance with some embodiments of the disclosed subject matter.

Turning to FIG. 3, an example of an illustrative system 300 suitable for implementation of mechanisms described herein for transforming fingerprints to detect unauthorized media content items is shown in accordance with some embodiments of the disclosed subject matter is shown. As illustrated, hardware 300 can include one or more servers, such as a server 302, a communication network 304, and/or one or more user devices 306, such as user devices 308 and 310.

In some embodiments, server(s) 302 can be any suitable server(s) for receiving query criterion that describe an observed circumvention technique, generate an abuse query based on the query criterion, receiving a transform to be applied to media content items responsive to an abuse query or abuse criterion, determining, from playback information, whether one or more media content items are responsive to an abuse query or abuse criterion, applying a transform to media content items responsive to an abuse query or abuse criterion, generating one or more fingerprints that represent at least a portion of the transformed media content item, determining whether the one or more fingerprints match a reference video content item, and/or performing any other suitable functions. For example, as described below in connection with FIGS. 5 and 6, server(s) 302 can associate and store an abuse query and a transform, such as a query-transform, in a query database and execute one or more of the stored query-transforms on media content items associated with a content server. As a more particular example, in some embodiments, at particular intervals (e.g., once a day, once a week, etc.), server(s) 302 can execute query-transform pairs to determine whether representations of transformed media content items responsive to the query in the query-transform pairs match reference media content items. As a more particular example, in some embodiments, server(s) 302 can generate fingerprints of the entire video content item as well as portions of the video content item (e.g., the audio portion of the video content item, the melody of the video content item, the opening introduction of the video content item, etc.). In some embodiments, server(s) 302 can be omitted.

Communication network 304 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links 312 and/or 314 to communication network 304 that can be linked via one or more communications links (e.g., communications link 316) to server(s) 302. Communications links 312, 314, and/or 316 can be any communications links suitable for communicating data among user devices 306 and server(s) 302 such as network links, dial-up links, wireless links, hard-wired links, any other suitable communications links, or any suitable combination of such links.

In some embodiments, user devices 306 can include one or more computing devices suitable for transmitting a video content item to server(s) 302, transmitting information related to the video content item to server(s) 302, and/or any other suitable functions. For example, in some embodiments, user devices 306 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 302 is illustrated as a single device, the functions performed by server 302 can be performed using any suitable number of devices in some embodiments. For example, in some embodiments, multiple devices can be used to implement the functions performed by server 302. In a more particular example, a first server can be used to store media content items, a second server can be used to store playback information associated with the playback and/or consumption of media content items, such as playback speed, referral URL, focus for spherical video content items, player cropping, audience retention rate, vertical information, etc., a third server can be used to determine whether a transformed fingerprint matches a reference media content item, a fourth server can be used to store clearance information relating to media content items that are deemed non-responsive to an abuse query, and/or a fifth server can be used take action in response to determining that a transformed fingerprint associated with a transformed media content item matches a reference media content item (e.g., flag a user account, flag a channel or media source in which the transformed media content item was uploaded, remove the media content item such that other users of the content server are inhibited from consuming the media content item, etc.).

Although two user devices 308 and 310 are shown in FIG. 3, any suitable number of user devices, and/or any suitable types of user devices, can be used in some embodiments.

Figure 4:
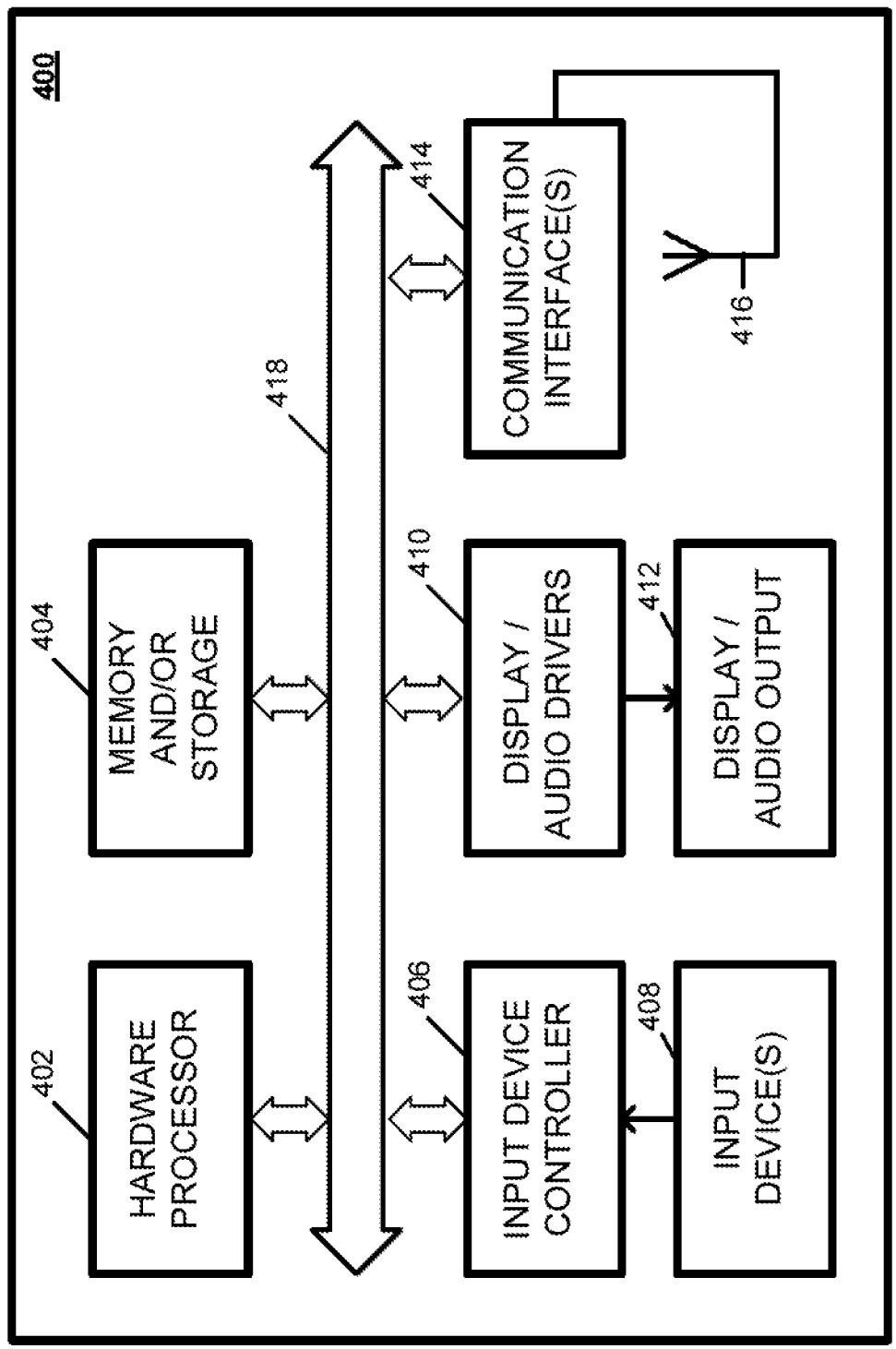
FIG. 4 shows a detailed example of hardware that can be used in a server and/or a user device of FIG. 3 in accordance with some embodiments of the disclosed subject matter.

Server(s) 302 and user devices 306 can be implemented using any suitable hardware in some embodiments. For example, in some embodiments, devices 302 and 306 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, message interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as server 302). For example, the server program can cause hardware processor 402 execute an abuse query to determine whether video content items match the abuse query, flag video content items that match the abuse query, flag video content items that are cleared of the abuse query, transform the matching video content items, fingerprint one or more frames of a transformed video content item, determine whether the fingerprint(s) match a video content item in a reference database, block a video content item in response to determining the video content item matches a video content item in a reference database, and/or perform any other suitable actions. In some embodiments, hardware processor 402 can be controlled by a computer program stored in memory and/or storage 404 of user device 306. For example, the computer program can cause hardware processor 402 to transmit a video content item to server(s) 302, and/or perform any other suitable actions.

Memory and/or storage 404 can be any suitable memory and/or storage for storing programs, data, media content, advertisements, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In another example, input device controller 406 can be circuitry for receiving input from a head-mountable device (e.g., for presenting virtual reality content or augmented reality content).

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

Figure 5:
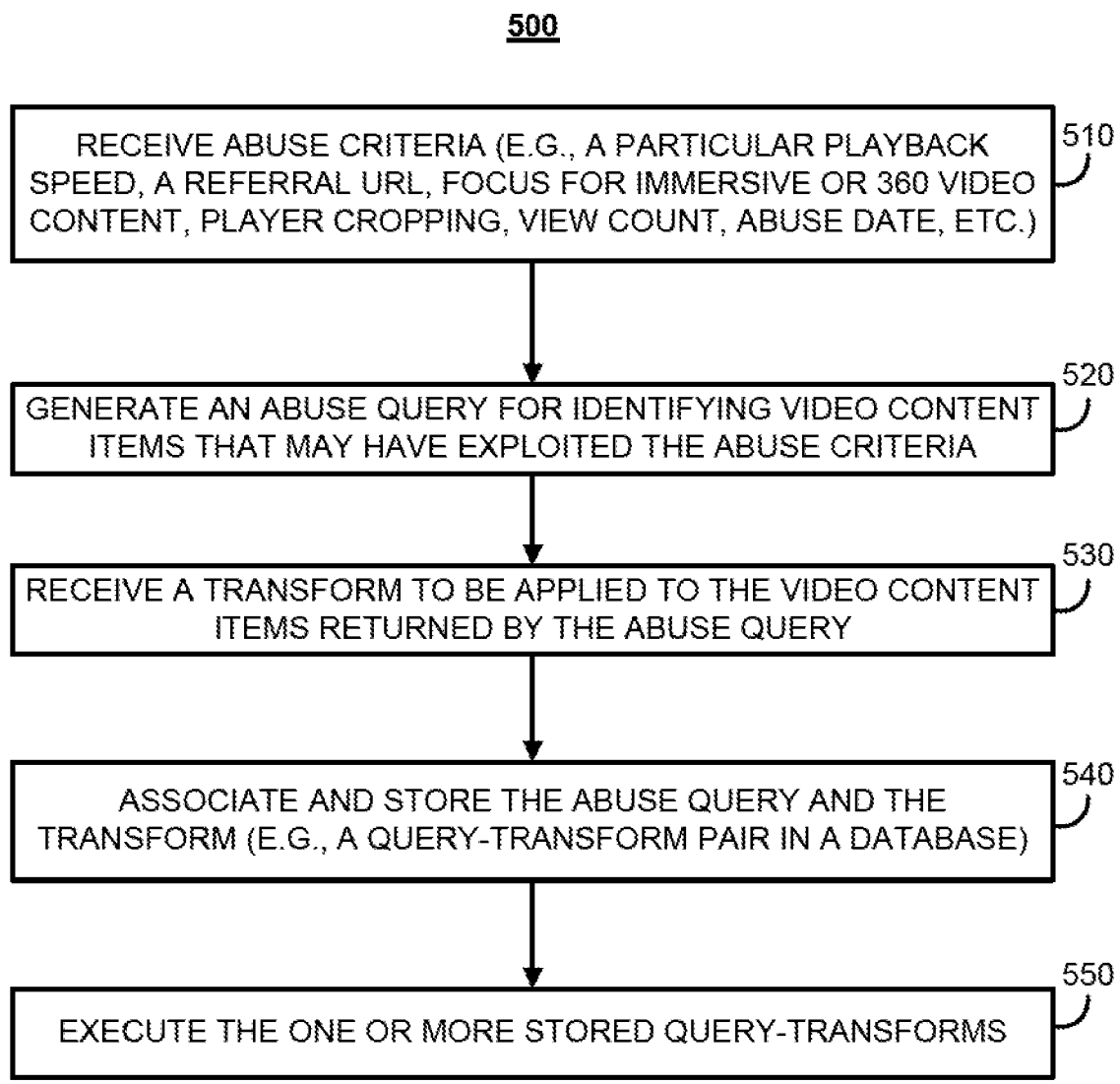
FIG. 5 shows an illustrative example of a process for generating and executing an abuse query on multiple video content items in accordance with some embodiments of the disclosed subject matter.

Turning to FIG. 5, an illustrative example 500 of a process for generating and executing one or more query-transforms in connection with video content items is shown in accordance with some embodiments of the disclosed subject matter. In some embodiments, blocks of process 500 can be executed on server(s) 302.

Process 500 can begin by receiving abuse criteria associated with a circumvention technique that may have been applied to one or more video content items at 510. The received abuse criteria can include one or more terms that describe a circumvention technique that may have been applied to one or more video content items, such as an adjusted playback speed for a video content item, referral URL associated with a video content item, a position or a focus for a spherical video content item, a region cropped out of a video content item, etc. For example, process 500 can present a user interface, such as user interface 100 shown in FIG. 1, to prompt a user to input abuse criteria associated with a circumvention technique that has been observed by the user.

It should be noted that any suitable circumvention technique may have been used to modify a video content item. For example, the received abuse criteria can describe a circumvention technique applied to the video content item such that the video content item is presented at half of its original playback speed. Other examples of circumvention techniques include modifying a referral URL, modifying a focus or position in a 360-degree spherical video content items, modifying the video content item by cropping out or otherwise removing a portion of the video content item, modifying the video content item by rotating by the video content item a particular angle (e.g., portrait orientation to landscape orientation) at a particular time within the video content item, etc.

It should also be noted that the abuse criteria can be received in any suitable form. For example, the abuse criteria can include keywords that describe the circumvention technique that may have been applied to one or more video content items. In a more particular example, in the instance where the applied circumvention technique presents a video content item at half of its original playback speed, the abuse criteria can include playback speed, half speed or 0.5×, and entire video.

In some embodiments, an example of a video content item in which a circumvention technique may have been applied can be uploaded for analysis. For example, as described above, process 500 can present a user interface, such as user interface 100 shown in FIG. 1, to prompt a user to input abuse criteria associated with a circumvention technique that has been observed by the user. In continuing this example, as shown in user interface 200 of FIG. 2, the user interface can also provide the user with an opportunity to upload an exemplary video content item in which a circumvention technique may have been applied. In response, process 500 can review, for example, playback action information associated with the uploaded video content item to determine how viewers are consuming the video content item (e.g., playing back the video content item at twice the speed for the entire video, moving to a particular position within a spherical video content item and remaining at that position for a given time, etc.). Based on the reviewed playback action information and/or other information associated with the uploaded video content item, process 500 can determine abuse criteria corresponding to the video content item (e.g., playback speed, 0.5× normal playback, etc.).

Additionally or alternatively, when reviewing an uploaded video content item, process 500 can review textual information associated with the video content item, such as a description of the video content item, a title of the video content item, textual content that appears within the video content item, etc. For example, process 500 can determine whether a description of the video content item includes instructions to the viewer to perform particular playback actions—e.g., an instruction directing the viewer to playback the video content item at 2× speed, an instruction directing the viewer to navigate to particular coordinates within a spherical video content item, etc. In response, process 500 can extract abuse criteria from the corresponding description.

In some embodiments, the abuse criteria can include any suitable information describing the application of a circumvention technique, such as a detected abuse date or other suitable timing information. This can include, for example, a detected abuse date at which a first instance of the circumvention technique was observed. In some embodiments, process 500 can use the detected abuse date to filter the video content items and obtain a subset of video content items that have been uploaded to a content server after the detected abuse date. In continuing this example, in response to receiving a detected abuse date within the abuse criteria, process 500 can determine whether a threshold number of video content items (e.g., more than ten) have been uploaded to the content server after the detected abuse date in order to continue the steps of process 500.

In some embodiments, process 500 can access playback information and determine potential abuse criteria based on the playback information. For example, process 500 can begin by accessing playback logs or other suitable sources of playback information associated with a corpus of video content items and analyze the playback logs to determine one or more playback actions that are commonly performed when playing back video content items in the corpus of video content items. In a more particular example, playback information associated with media content items can be aggregated, which can include the playback speed set by a user when playing back a media content item, a referral URL associated with a media content item, a focus to a particular position or angle within a spherical media content item, player cropping information, audience retention rate information, vertical information, etc. It should be noted that process 500 can determine whether a playback action performed by a user having a user account is similar to a playback action performed by another user having a user account using any suitable technique or combination of techniques. In some embodiments, process 500 can cluster video content items having similar playback actions performed by users (e.g., the same or similar playback speed actions, the same or similar positions in a spherical video content item, the same or similar skip action at a particular time, etc.) and determine whether the playback action being performed with each cluster of video content items is deemed uncharacteristic of expected user behavior.

Referring back to FIG. 5, at 520, process 500 can generate an abuse query for identifying video content items that may have exploited the circumvention technique having the abuse criteria. For example, in response to receiving user-inputted abuse criteria, process 500 can generate an abuse query for transmission to a content system based on the user-inputted abuse criteria. In a more particular example, in response to receiving the user-inputted abuse criteria of "0.5× playback rate" and "entire video," process 500 can generate an abuse query in a structured query language, such as "SELECT*FROM videos WHERE playback_rate=0.5." In another more particular example, as described above in some instances, process 500 can append one or more media properties or criterion (e.g., view count, upload date, etc.) to further filter video content items for executing the abuse query, such as "SELECT*FROM videos WHERE playback_rate=0.5 AND WHERE upload_date BETWEEN '2017-01-01' AND '2017-05-01' AND WHERE min_view_count=100."

It should be noted that any suitable abuse query can be generated. For example, alternatively or additionally to generating an abuse query in a structured query language, process 500 can generate an abuse query in the form of keywords associated with the received abuse criteria. In another example, the abuse query can include a particular number of keywords (e.g., one, two, etc.) extracted from the received abuse criteria.

Referring back to FIG. 5, at 530, process 500 can receive a transform for applying to the video content items that are returned by the abuse query generated at 520. For example, in instances where the abuse query in a structured query language is generated from user-inputted abuse criteria, process 500 can receive a user-inputted transform to be applied to the video content items that are returned in response to the abuse query. In a more particular example, process 500 can present a user interface, such as the user interface shown in FIG. 2, that prompts the user to select a transform from a list of available transforms. In another example, in instances where the abuse query is determined from an exemplary video content item that has been identified and/or uploaded by a user as being modified by a circumvention technique, process 500 can determine which transform should be applied to video content items that are returned in response to the abuse query. In a more particular example, process 500 can present a user interface, such as the user interface shown in FIG. 2, that presents the automatically selected transform for verification by the user.

In some embodiments, at 530, process 500 can associate the generated abuse query with the received transform and store the associated abuse query and transform in a storage device. For example, process 500 can store each associated abuse query and transform as a query-transform pair in a database. In another example, process 500 can store each associated abuse query and transform in a row of a text file. It should be noted that the associated abuse query and transform can be stored in any suitable format.

In some embodiments, prior to storing query-transform information associated with a potential circumvention technique that has been applied to video content items or prior to executing an abuse query as described below in connection with 540, process 500 can determine whether the abuse query meets a particular media property criterion. Such a media property criterion can include, for example, a threshold number of video content items that are returned in response to the abuse query (e.g., at least fifteen content items). In another example, a media property criterion can include a threshold number of video content items (e.g., one hundred video content items) that have been uploaded after a detected abuse date or other timing information. In yet another example, a media property criterion can include a threshold number of video content items (e.g., at least fifteen content items) in which the video content items have reached a particular view count (e.g., at least one hundred views).

In some embodiments, at 540, process 500 can execute one or more query-transforms stored in the storage device.

It should be noted that each of the query-transforms can be executed at any suitable interval. For example, a query-transform can be placed in a queue of query-transforms and, in response to the queue of query-transforms reaching a particular number (e.g., ten), the query-transforms in the queue can be executed. In continuing this example, this queue of query-transforms can be re-executed at particular time intervals (e.g., every week, every month, etc.). In another example, an individual query-transform can be executed at a particular time, such as two minutes after being stored in the storage device at 540 and, upon detecting at least a threshold number of video content items using a circumvention technique, the query-transform can be re-executed at particular time intervals (e.g., every week). In yet another example, one or more query-transforms can be executed in response to a particular event, such as applying the query to video content items of a particular content type that have reached a particular view count.

In some embodiments, process 500 can determine whether a query-transform overlaps with another query-transform. For example, in response to determining that the transform being applied in a first query-transform pair is the same as the transform being applied in a second query-transform pair, process 500 can determine that a transform is to be applied to the video content items once and used for both the first-query transform pair and the second-query transform pair.

Figure 6:
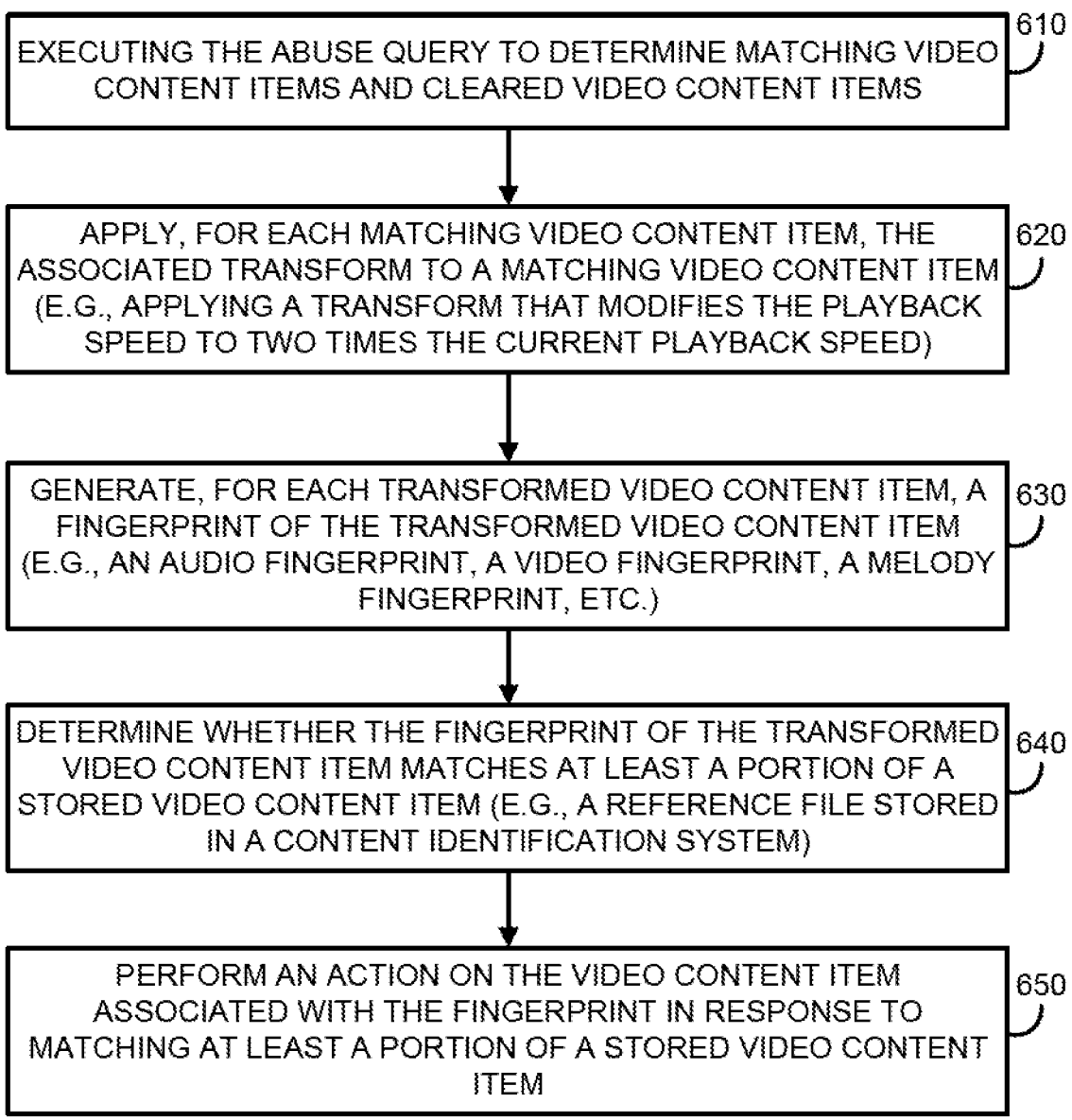
FIG. 6 shows an illustrative example of a process for generating one or more fingerprints of a transformed video content item to detect the abusive or unauthorized upload of the video content items in accordance with some embodiments of the disclosed subject matter.

Turning to FIG. 6, an illustrative example 600 of a process for transforming fingerprints to detect unauthorized video content items is shown in accordance with some embodiments of the disclosed subject matter. In some embodiments, blocks of process 600 can be executed on server(s) 302.

Process 600 can begin by executing the abuse query to determine matching video content items and cleared video content items at 610. For example, as described above in connection with FIG. 5, process 600 can access a database or other suitable storage device to obtain a query-transform pair at any suitable interval and, in response to retrieving the query-transform pair, can execute the abuse query with multiple video content items associated with a content server, where the query can include accessing playback logs or any other suitable source that includes playback information related to the video content items. In a more particular example, the abuse query can include a structured query that searches through the playback logs to determine video content items that have been played back by users at twice the initial playback rate (e.g., 2× speed) for the entirety of the video. In response to executing this abuse query, process 600 can determine a subset of matching video content items in which the behavior or circumvention technique described in the abuse query has been detected.

Additionally, process 600 can determine a subset of cleared video content item (e.g., those video content items that do not match the abuse criteria in the query) in which the behavior or circumvention technique described in the abuse query has not been detected. This can include, for example, storing an indication of a cleared video content item for a particular abuse query in a clearance log. It should be noted that, by storing such an indication, overlapping abuse queries that apply the same transform as a previously executed abuse query may not be re-run for cleared video content items for the previously executed abuse query based on the stored clearance indication.

In some embodiments, process 600 can associate each video content item in a corpus of video content items with an indicator that indicates whether a video content item matches a particular query. For example, for a query that searches for spherical video content items in which a particular viewing angle or position is used for the entirety of the playback of the spherical video content item, a query result indicator for the particular query can be associated and/or stored with the video content item. This can include, for example, spherical video content items in which playback is performed by users as a first angle and spherical video content items in which playback is performed by other users at a second angle. In continuing this example, in response to determining that a subsequent query in a different query-transform pair is searching for similar playback behavior, process 600 can access the query result indicator. Additionally or alternatively, process 600 can determine whether the subsequent query should be re-run against the corpus of video content items.

In some embodiments, in response to determining that a transform to a video content item has been applied in connection with a previous query-transform pair, process 600 can filter out cleared video content items based on the query result indicator or any other suitable information resulting from the previously executed query.

Referring back to FIG. 6, process 600 can apply, for each matching video content item, the associated transform to a matching video content item at 620. For example, using a video editing application, the transform associated with the abuse query can be applied to the matching video content item to obtain a transformed video content item. In a more particular example, using a video editing application, the transform from the query-transform pair can be applied to the matching video content item such that the circumvention technique is reversed (e.g., a playback speed modification that doubles the playback speed of video content items that were modified to play back at half-speed). It should be noted that one or more applications can be used to apply different transform to video content items.

In some embodiments, at 630, process 600 can generate one or more fingerprint representations of the transformed video content item using any suitable fingerprinting technique (e.g., a video fingerprint, an audio fingerprint, a melody fingerprint, any suitable type of fingerprinting analysis, and/or any suitable combination thereof). In a more particular example, one fingerprint technique can include determining individual interest points that identify unique characteristics of local features of the time-frequency representation of the video content item. This can include, for example, identifying unique characteristics of a spectrogram associated with the video content item. An interest point can be defined as a spectral peak or spectral event of a specific frequency over a specific duration of time. In some embodiments, an interest point can also include timing of the onset of a note. One or more fingerprints can then be generated as functions of the sets of interest points.

It should be noted that a fingerprint of the transformed video content item can be generated to represent the entire transformed video content item or a portion of the video content item. For example, in response to determining that a portion of the matching video content item is sped up by users during playback (e.g., twice the speed), process 600 can select that portion of the video content item, transform the selected portion of the video content item, and generate one or more fingerprints that represent the transformed portion of the video content item.

In some embodiments, multiple fingerprints associated with a transformed video content item can be generated using multiple fingerprinting techniques. For example, a first fingerprint that represents a video portion of the video content item can be generated, a second fingerprint that represents a background audio portion of the video content item can be generated, a third fingerprint that represents a recurring song within the video content item can be generated, a fourth fingerprint that represents a speech portion of the video content item can be generated, and/or a fifth fingerprint that represents a video portion corresponding to the opening credits within the video content item can be generated.

In response to obtaining a fingerprint or other suitable compact representation of the transformed video content item, process 600 can determine whether the generated fingerprint matches a reference content item or any other portion of a stored content item at 640. For example, the one or more fingerprints generated to represent the transformed video content item can be compared with reference fingerprints of reference content items (e.g., a database of copyrighted videos, a database of copyrighted audio tracks, and/or any other suitable content items).

In some embodiments, in response to determining that the fingerprint or other suitable compact representation of the transformed video content item matches a reference content item (e.g., where at least a threshold amount of a fingerprint corresponding to the transformed video content item matches a reference fingerprint corresponding to a reference content item), process 600 can perform an action on the video content item corresponding to the transformed video content item.

For example, in some embodiments, in response to determining that the fingerprint or other suitable compact representation of the transformed video content item matches a reference content item, the video content item can be tagged and/or marked in any suitable manner. In a more particular example, in some embodiments, process 600 can tag an identifier of the video content item, thereby causing the video content item to be flagged for manual review to verify whether a circumvention technique was applied to the video content item (e.g., where the transformed video content item matches a particular copyrighted video content item). In some such embodiments, process 600 can include any other suitable information, such as a frame number corresponding to the flagged portion of the video content item, an identifier of the reference content item that produced a match to the video content item, and/or any other suitable information.

In some embodiments, process 600 can inhibit or block the video content item from being presented to other viewers as a circumvention technique was likely applied and as it likely contains a copyrighted video content item. For example, process 600 can cause a warning message to be presented in place of the video content item. In another example, process 600 can modify the video content item (e.g., prevent movement to particular viewpoints, alter the video and/or audio content associated with the video content item, etc.).

In some embodiments, process 600 can determine a user account associated with a user that uploaded the video content item having the applied circumvention technique. For example, process 600 can transmit a notification to the user account of the detected circumvention technique applied to the uploaded video content items. In another example, process 600 can inhibit or block video content items associated with the user account from being presented to other viewers.

Alternatively, in response to determining that the fingerprint or other suitable compact representation of the transformed video content item does not match a reference content item, the video content item can be tagged and/or marked in any suitable manner. For example, in some embodiments, process 600 can tag video content item with an identifier indicating that the video content item has been cleared for the particular abuse query and the particular transform.

It should be noted that process 600 of FIG. 6 can be re-run at any suitable interval. For example, query-transform pairs that detect a threshold number of video content items in which a circumvention technique was applied can be selected for re-run at a first time interval (e.g., once a week), while query-transform pairs that detect less than the threshold number of video content item in which a circumvention technique was applied can be selected for re-run at a second time interface (e.g., once a month). In continuing this example, query-transform pairs that detect less than a given number of video content item in which a circumvention technique was applied can be removed from the storage device.

In some embodiments, at least some of the above described blocks of the process of FIGS. 5 and 6 can be executed or performed in any order or sequence not limited to the order and sequence shown in and described in connection with the figure. Also, some of the above blocks of FIGS. 5 and 6 can be executed or performed substantially simultaneously where appropriate or in parallel to reduce latency and processing times. Additionally or alternatively, some of the above described blocks of the process of FIGS. 5 and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for transforming fingerprints to detect unauthorized media content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for detecting unauthorized content items, the method comprising:
   receiving, via a user interface, criteria relating to an application of a circumvention technique to one or more video content items, wherein the criteria includes abuse criteria that describes the circumvention technique;
   determining whether the circumvention technique has been applied to other video content items by determining a transform to reverse the circumvention technique, applying the determined transform to a plurality of video content items to obtain a plurality of transformed video content items, and comparing each transformed video content item to reference video content items; and
   causing an action to be performed on a matching video content item in response to determining that the circumvention technique has been applied.

2. The computer-implemented method of claim 1, further comprising:
   generating an abuse query that includes at least a portion of the abuse criteria that describes the circumvention technique; and
   determining, from the plurality of video content items, a subset of video content items that are responsive to the abuse query, wherein the determined transform is applied to each video content item in the subset of video content items.

3. The computer-implemented method of claim 2, further comprising:
   generating, for each transformed video content item, a fingerprint that represents the transformed video content item, wherein comparing each transformed video content item to the reference video content items includes comparing the fingerprint of the transformed video content item to a plurality of fingerprints associated with reference video content items to determine whether the video content item corresponding to the transformed video content item matches one of the reference video content items.

4. The computer-implemented method of claim 2, wherein the subset of video content items is determined in response to detecting a media event associated with a portion of the plurality of video content items.

5. The computer-implemented method of claim 2, further comprising:
   storing the abuse query in association with the transform for applying to the video content item that matches the abuse query in a queue containing a plurality of abuse query-transform pairs; and
   executing the plurality of abuse query-transform pairs on the plurality of video content items at a given time interval.

6. The computer-implemented method of claim 2, further comprising searching, based on the abuse query, through playback information associated with the plurality of video content items to determine the subset of video content items.

7. The computer-implemented method of claim 1, wherein the criteria includes timing information that indicates a start time of the application of the circumvention technique and wherein the method further comprises filtering the plurality of video content items based on the timing information.

8. The computer-implemented method of claim 1, further comprising generating a plurality of fingerprints associated with the transformed video content item, wherein each of the plurality of fingerprints represents at least a portion of the transformed video content item.

9. The computer-implemented method of claim 1, further comprising causing an indication of the match to be transmitted to a computing device in response to determining that the video content item corresponding to the transformed video content item matches one of the reference video content items by at least a threshold amount.

10. A system for detecting unauthorized content items, the system comprising:
    a hardware processor that is configured to:
       receive, via a user interface, criteria relating to an application of a circumvention technique to one or more video content items, wherein the criteria includes abuse criteria that describes the circumvention technique;
       determine whether the circumvention technique has been applied to other video content items by determining a transform to reverse the circumvention technique, applying the determined transform to a plurality of video content items to obtain a plurality of transformed video content items, and comparing each transformed video content item to reference video content items; and
       cause an action to be performed on a matching video content item in response to determining that the circumvention technique has been applied.

11. The system of claim 10, wherein the hardware processor is further configured to:
    generate an abuse query that includes at least a portion of the abuse criteria that describes the circumvention technique; and
    determine, from the plurality of video content items, a subset of video content items that are responsive to the abuse query, wherein the determined transform is applied to each video content item in the subset of video content items.

12. The system of claim 11, wherein the hardware processor is further configured to:
    generate, for each transformed video content item, a fingerprint that represents the transformed video content item, wherein comparing each transformed video content item to the reference video content items includes comparing the fingerprint of the transformed video content item to a plurality of fingerprints associated with reference video content items to determine whether the video content item corresponding to the transformed video content item matches one of the reference video content items.

13. The system of claim 11, wherein the subset of video content items is determined in response to detecting a media event associated with a portion of the plurality of video content items.

14. The system of claim 11, wherein the hardware processor is further configured to:
    store the abuse query in association with the transform for applying to the video content item that matches the abuse query in a queue containing a plurality of abuse query-transform pairs; and
    execute the plurality of abuse query-transform pairs on the plurality of video content items at a given time interval.

15. The system of claim 11, wherein the hardware processor is further configured to search, based on the abuse query, through playback information associated with the plurality of video content items to determine the subset of video content items.

16. The system of claim 10, wherein the criteria includes timing information that indicates a start time of the application of the circumvention technique and wherein the method further comprises filtering the plurality of video content items based on the timing information.

17. The system of claim 10, wherein the hardware processor is further configured to generate a plurality of fingerprints associated with the transformed video content item, wherein each of the plurality of fingerprints represents at least a portion of the transformed video content item.

18. The system of claim 10, wherein the hardware processor is further configured to cause an indication of the match to be transmitted to a computing device in response to determining that the video content item corresponding to the transformed video content item matches one of the reference video content items by at least a threshold amount.

19. A non-transitory computer-readable medium containing computer-executable instructions that, when executed by a processor, cause the processor to perform a method for detecting unauthorized content items, the method comprising:
    receiving, via a user interface, criteria relating to an application of a circumvention technique to one or more video content items, wherein the criteria includes abuse criteria that describes the circumvention technique;
    determining whether the circumvention technique has been applied to other video content items by determining a transform to reverse the circumvention technique, applying the determined transform to a plurality of video content items to obtain a plurality of transformed video content items, and comparing each transformed video content item to reference video content items; and causing an action to be performed on a matching video content item in response to determining that the circumvention technique has been applied.

* * * * *